(12) United States Patent
Nietling et al.

(10) Patent No.: US 11,658,360 B2
(45) Date of Patent: May 23, 2023

(54) BATTERY PACK

(71) Applicants: Bosch Battery Systems GmbH, Stuttgart (DE); Robert Bosch GmbH, Stuttgart (DE)

(72) Inventors: David Nietling, Metamora, MI (US); Kyle Schultz, Almont, MI (US); David Naughton, Oxford, MI (US); Mehul Botadra, Sterling Heights, MI (US); Ruben Jung, Stuttgart (DE); Walter Jasch, Stuttgart (DE); Stefan Grun, Kirchheim Teck (DE); Lisa Lorenz, Stuttgart (DE)

(73) Assignees: Robert Bosch Battery Systems GmbH, Stuttgart-Feluerbach (DE); Robert Bosch GmbH, Stuttgart (DE)

( * ) Notice: Subject to any disclaimer, the term of this patent is extended or adjusted under 35 U.S.C. 154(b) by 284 days.

(21) Appl. No.: 16/933,795

(22) Filed: Jul. 20, 2020

(65) Prior Publication Data
US 2020/0350534 A1    Nov. 5, 2020

Related U.S. Application Data

(63) Continuation of application No. 15/059,726, filed on Mar. 3, 2016, now abandoned.

(51) Int. Cl.
*H01M 10/6554*    (2014.01)
*H01M 10/6551*    (2014.01)
(Continued)

(52) U.S. Cl.
CPC ....... *H01M 10/658* (2015.04); *H01M 10/425* (2013.01); *H01M 10/613* (2015.04);
(Continued)

(58) Field of Classification Search
CPC .......... H01M 10/615; H01M 10/6571; H01M 10/425; H01M 10/613; H01M 10/625;
(Continued)

(56) References Cited

U.S. PATENT DOCUMENTS 6,087,036 A    7/2000    Rouillard et al.
9,160,038 B2   10/2015   Buck et al.
(Continued)

FOREIGN PATENT DOCUMENTS

CN    104170118    11/2014
JP    2005339925   12/2005
(Continued)

OTHER PUBLICATIONS

PCT International Search Report for PCT/EP2017/051411.

*Primary Examiner* — Stewart A Fraser
*Assistant Examiner* — Lilia Nedialkova
(74) *Attorney, Agent, or Firm* — Kelly McGlashen; Maginot, Moore & Beck LLP (57) ABSTRACT

A battery pack includes a housing and electrochemical cells disposed in the housing. The housing includes a container and a lid that closes an open end of the container. The container has a base, an outer wall the surrounds the base, and a first and a second inner wall disposed inside the outer wall. The first inner wall extends between, and is fixed to, a first portion and a third portion of the outer wall, and is spaced apart from a second portion and a fourth portion of the outer wall. The second inner wall extends between the first portion and the third portion, and is disposed between the first inner wall and the fourth portion. The second inner wall is movable relative to the outer wall such that spacing of the second inner wall from the first inner wall can be changed.

18 Claims, 6 Drawing Sheets

(51) Int. Cl.
  *H01M 10/658*  (2014.01)
  *H01M 10/647*  (2014.01)
  *H01M 10/6556* (2014.01)
  *H01M 50/262*  (2021.01)
  *H01M 50/209*  (2021.01)
  *H01M 10/613*  (2014.01)
  *H01M 10/625*  (2014.01)
  *H01M 10/42*   (2006.01)

(52) U.S. Cl.
  CPC ....... *H01M 10/625* (2015.04); *H01M 10/647* (2015.04); *H01M 10/6551* (2015.04); *H01M 10/6554* (2015.04); *H01M 10/6556* (2015.04); *H01M 50/209* (2021.01); *H01M 50/262* (2021.01); *H01M 2010/4271* (2013.01); *H01M 2220/20* (2013.01)

(58) Field of Classification Search
  CPC ........... H01M 10/647; H01M 10/6551; H01M 10/6554; H01M 10/6556; H01M 10/658; H01M 50/209; H01M 50/227; H01M 50/233; H01M 50/249; H01M 50/262; H01M 50/267; H01M 50/269; H01M 50/284; H01M 50/291; H01M 50/293
  See application file for complete search history.

(56) References Cited

U.S. PATENT DOCUMENTS

| | | | |
|---|---|---|---|
| 2009/0239137 A1* | 9/2009 | Kakuchi | H01M 50/463 429/151 |
| 2011/0294000 A1* | 12/2011 | Kim | H01M 50/20 429/177 |
| 2013/0130087 A1 | 5/2013 | Kawaguchi et al. | |
| 2013/0288098 A1 | 10/2013 | Frutschy et al. | |
| 2014/0342197 A1 | 11/2014 | Andres et al. | |
| 2015/0030890 A1 | 1/2015 | Inoue | |
| 2015/0037647 A1 | 2/2015 | Nguyen et al. | |
| 2015/0069829 A1 | 3/2015 | Dulle et al. | |
| 2015/0214570 A1 | 7/2015 | Deponte et al. | |
| 2015/0280193 A1 | 10/2015 | Ohshiba et al. | |

FOREIGN PATENT DOCUMENTS

| | | |
|---|---|---|
| JP | 2009238606 | 10/2009 |
| JP | 2011249315 | 12/2011 |
| JP | 2014175078 | 9/2014 |

\* cited by examiner

BATTERY PACK

CROSS-REFERENCE TO RELATED APPLICATION

This application is a continuation of U.S. patent application Ser. No. 15/059,726, filed Mar. 3, 2016, which is incorporated by reference herein in its entirety.

BACKGROUND

1. Field of the Invention

The present invention relates to a battery pack for storage of electrochemical cells, including a battery pack housing having passive cooling features as well as features that minimize outer wall stress due to electrochemical cell growth.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in stacks and are electrically connected in series or in parallel. Likewise, the battery modules within a battery pack are electrically connected in series or in parallel.

Some battery packs used with conventional hybrid electric vehicles are designed to provide a relatively high voltage, for example 400 volts (V). To achieve the high voltage, battery packs are relatively large and include hundreds of electrochemical cells. Moreover, to accommodate the high voltage, the components in the electrical system are relatively expensive and subject to high voltage protection requirements. It is desirable to form a battery pack which has fewer and less expensive components.

SUMMARY

In some aspects, a battery pack housing is configured to receive a plurality of electrochemical cells. The battery pack housing includes a container, and the container includes a base, an outer wall, a first inner wall and a second inner wall. The base includes an inner surface, an outer surface opposed to the inner surface, and a peripheral edge that joins the inner surface to the outer surface. The outer wall surrounds the peripheral edge and protrudes from the base in a direction that is normal to the inner surface of the base. The outer wall includes a first portion, a second portion adjoining the first portion, a third portion adjoining the second portion and opposed to the first portion, and a fourth portion opposed to the second portion. The first inner wall extends between the first portion and the third portion, and the first inner wall is fixed to each of the first portion and the third portion. The second inner wall extends between the first portion and the third portion, and is disposed between the first inner wall and the fourth portion. The second inner wall is movable relative to the outer wall such that a spacing of the second inner wall from the first inner wall can be changed.

The battery pack housing may include one or more of the following features: The first inner wall is spaced apart from the second portion and the fourth portion, whereby a gap exists between the first inner wall and the second portion. Each of the first inner wall and the second inner wall is hollow and includes opposed inner and outer surfaces and ribs that extend between the opposed inner and outer surfaces, the ribs defining vacancies within each of the first inner wall and the second inner wall. A spacer is disposed between the second inner wall and the fourth portion. The second inner wall has an inner surface that is parallel to and faces the second portion, and an outer surface that faces the fourth portion, and at least a portion of the outer surface of the second inner wall is not parallel to the fourth portion. A portion of an outer surface of the outer wall is formed having outwardly protruding cooling ribs. The battery pack housing is formed of a non-electrically conductive material. The outer wall is formed of a first element, a second element formed separately from, and detachably connected to, the first element, and a latching member. The first element includes the first portion, the second portion and the third portion arranged in a U-shape. An inner surface of the first element includes first surface features configured to receive the latching member. The second element includes the fourth portion, and an inner surface of the second element includes second surface features configured to receive the latching member and cooperate with first surface features to detachably connect the first element to the second element. The second element includes the second inner wall, and the second inner wall is parallel to and spaced apart from the fourth portion via a spacer. The latching member is a pin, the first surface features include a first through opening and the second surface features include a second through opening, and the pin extends through both the first through opening and the second through opening. The second through opening is aligned with the first through opening along an axis normal to the inner surface of the base.

In some aspects, a battery pack includes a battery pack housing and electrochemical cells disposed in the housing. The housing comprising a container that includes a base, an outer wall, a first inner wall and a second inner wall. The base includes an inner surface, and outer surface opposed to the inner surface, and a peripheral edge that joins the inner surface to the outer surface. The outer wall surrounds the peripheral edge and protrudes from the base in a direction that is normal to the inner surface of the base. The outer wall includes a first portion, a second portion adjoining the first portion, a third portion adjoining the second portion and opposed to the first portion, and a fourth portion opposed to the second portion. The first inner wall extends between the first portion and the third portion, and the first inner wall is fixed to each of the first portion and the third portion. The second inner wall extends between the first portion and the third portion, and is disposed between the first inner wall and the fourth portion. The second inner wall is movable relative to the outer wall such that a spacing of the second inner wall from the first inner wall can be changed.

The battery pack may include one or more of the following features: The first inner wall is spaced apart from the second portion and the fourth portion, whereby a gap exists between the first inner wall and the second portion. Each of the first inner wall and the second inner wall is hollow and includes opposed inner and outer surfaces and ribs that extend between the opposed inner and outer surfaces, the ribs defining vacancies within each of the first inner wall and the second inner wall. The second inner wall has an inner surface that is parallel to and faces the second portion, and an outer surface that faces the fourth portion, and at least a portion of the outer surface of the second inner wall is not parallel to the fourth portion. A spacer is disposed between the second inner wall and the fourth portion. The battery pack includes a battery management device including electronics configured to monitor and control function of the electrochemical cells, and the battery management device is disposed in the container between the second inner wall and the fourth portion. The outer wall is formed of a first element, a second element formed separately from, and detachably connected to, the first element, and a latching member. The first element includes the first portion, the second portion and the third portion arranged in a U-shape, and an inner surface of the first element includes first surface features configured to receive the latching member. The second element includes the fourth portion, and an inner surface of the second element includes second surface features configured to receive the latching member and cooperate with first surface features to detachably connect the first element to the second element. The electrochemical cells are arranged side-by-side within the housing, and an insulating sheet is disposed between each electrochemical cell. The electrochemical cells are supported on the base such that an outer surface of the cell housing directly contacts the base inner surface.

In some aspects, a battery pack that produces a voltage of less than 60 V can be used as part of the power system of a hybrid electric vehicle, whereby it is possible to reduce power system costs and complexity. Because the voltage produced by the battery pack is less than 60 V, the components used to form the battery pack are less expensive.

The battery pack housing is configured to receive a plurality of prismatic cells. In some embodiments, the prismatic cells have a metal housing and thus may have an electric charge due to contact between the electrolyte disposed in the cell and the cell housing. The battery pack housing is formed of a material that is electrically nonconductive and thermally conductive. This can be compared to some conventional battery pack housings which are formed of an electrically conductive material such as metal, and in which insulating structures must be interposed between the prismatic cell housing and the battery pack housing, as well as between adjacent cells. By forming the battery pack housing of a non-electrically conductive material, it is possible for the cells to rest in direct contact with the housing without risk of forming an electrical short circuit. Since the insulating structures can be simplified, the battery pack housing can be reduced in size and the cost of materials and assembly can be reduced.

By forming the battery pack housing of a thermally conductive material, passive cooling of the battery pack housing and the cells disposed therein is enhanced. Advantageously, an outer surface of the battery pack housing includes cooling fins that further facilitate heat exchange with the ambient air.

The battery pack housing includes a container and a lid that closes an open end of the container. The container is formed having a dual-wall sidewall structure in which inner wall portions are spaced apart from the outer wall. In the illustrated embodiments, the container includes two inner wall portions disposed inside the outer wall and arranged in parallel to each other and to opposed side portions of the outer wall. The first inner wall portion is fixed within the container so as to be adjacent to and spaced apart from one side portion of the outer wall. The second inner wall portion is moveable within the container and is located adjacent to and spaced apart from the opposed side portion of the outer wall. The electrochemical cells are disposed side-by-side in the container between the first and second inner wall portions such that a stacking axis that is transverse to the confronting sides of the cells passes through the one side portion and the opposed portion of the outer wall. During assembly, the second inner wall portion is moved as a unit toward the first inner wall portion placing the cells under a compressive load. In addition, the stacking axis is parallel to a cell growth direction of the prismatic cells, whereby any expansion of the cells due to cell growth results in a force applied to the inner wall portions along the stacking axis. The inner wall portions are configured to accommodate stresses due to prismatic cell growth. For example, upon sufficient growth, the inner wall portions may change shape (deform or slightly deflect) to accommodate the force. Because the inner wall portions are spaced apart from the outer wall portions, and the prismatic cell growth is accommodated by the inner wall portions, the force is not applied to the outer wall portions. As a result, the outer wall is dimensionally stable. By providing an outer wall that is dimensionally stable, a seal that is provided between the outer wall of the container and the lid is more reliable than some battery pack housings in which the sidewall may be affected by cell growth. The seal prevents particles and/or moisture from entering the interior space of the battery pack housing, whereby battery pack operability, reliability and longevity is improved.

DETAILED DESCRIPTION

Figure 1:
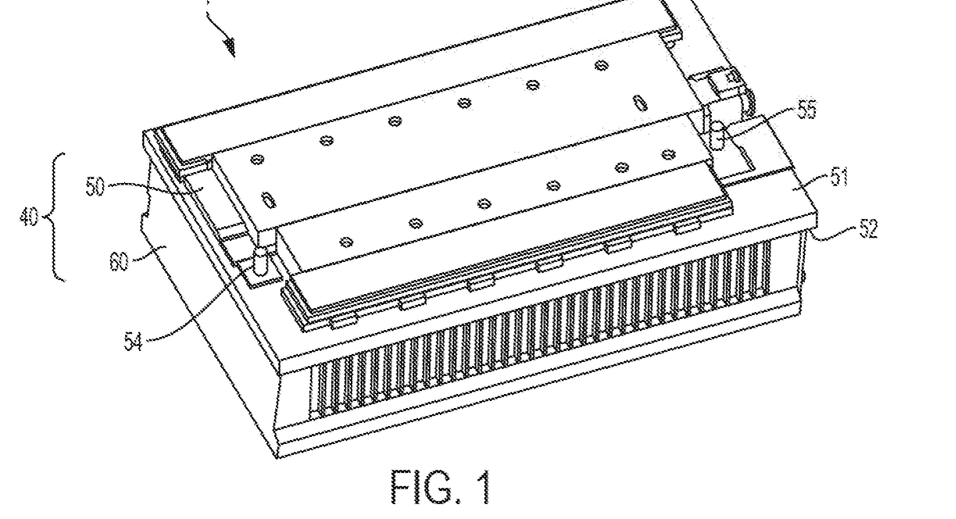
FIG. 1 is top perspective view of a battery pack.
Figure 2:
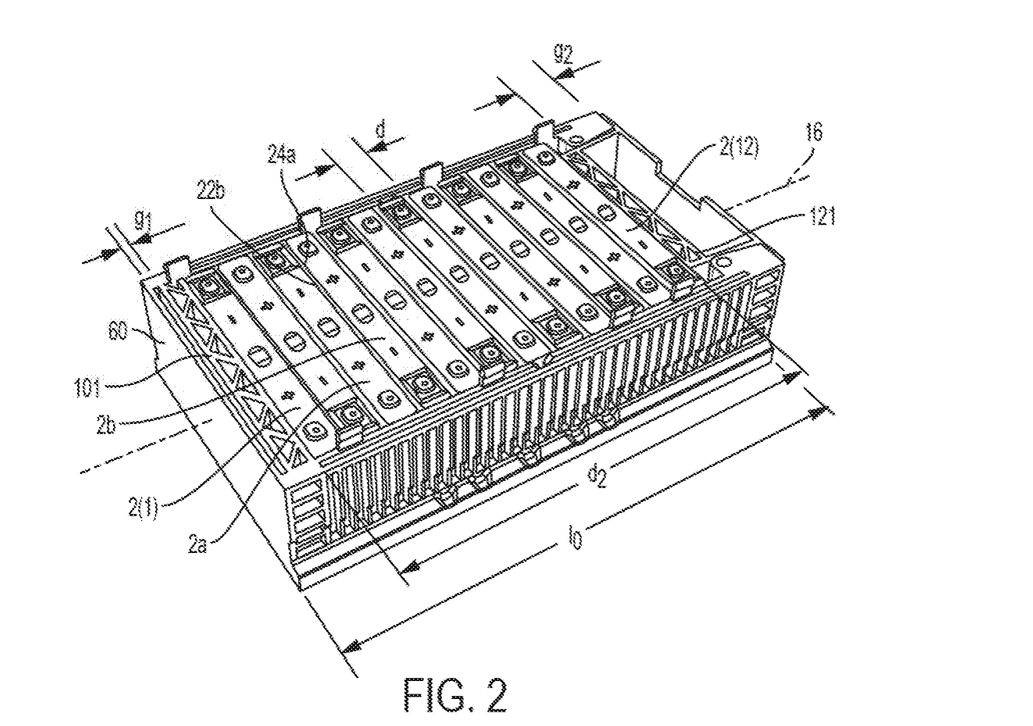
FIG. 2 is a top perspective view of the battery pack of FIG. 1 with the lid omitted.

Referring to FIGS. 1-2, a battery pack 1 is a power generation and storage device that includes electrochemical cells 2 that are electrically interconnected and stored in an organized manner within a battery pack housing 40. The battery housing 40 includes a container 60 and a lid 50 that closes an open end of the container 60. Within the battery pack housing 40, the array of cells 2 are electrically connected in series or in parallel to battery pack terminals 54, 55 that protrude from the lid 50. The battery pack housing 40 including the lid 50 and container 60 is formed of a non-electrically conductive material. In addition, the container 60 has passive cooling features as well as features that minimize outer wall stress due to electrochemical cell growth, as discussed in detail below.

Figure 3:
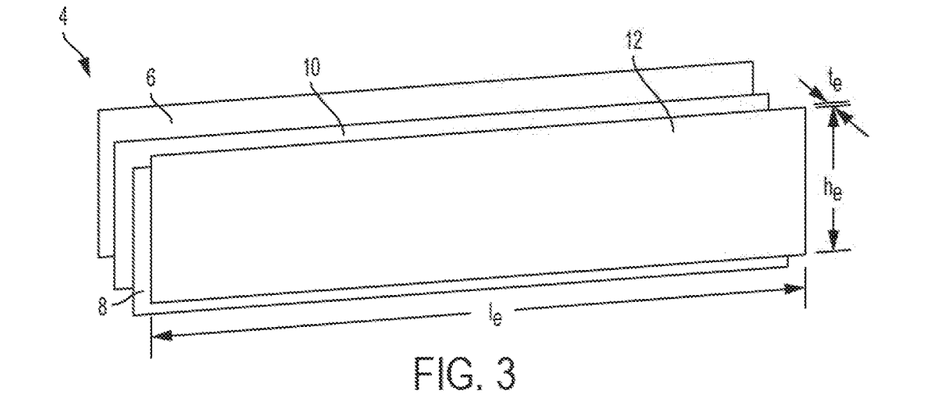
FIG. 3 is a schematic view of the arrangement of electrode and separator strips used to form the electrode assembly of each cell.
Figure 4:
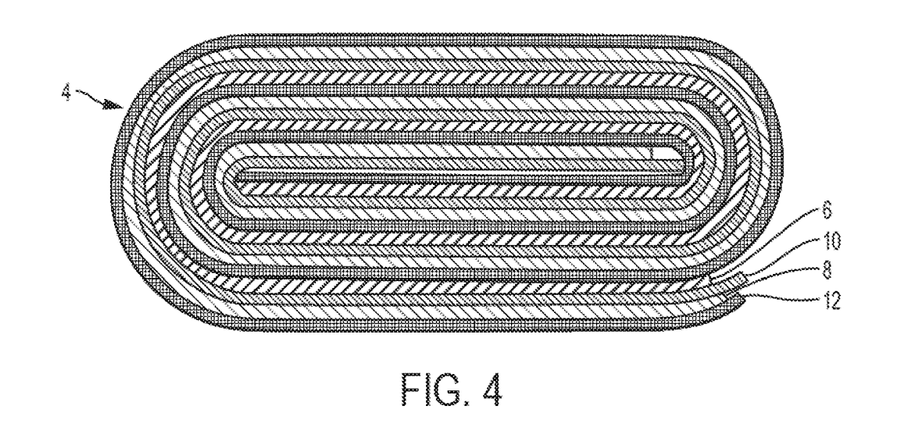
FIG. 4 is a cross-sectional view of the electrode assembly as seen in a direction transverse to the electrode winding axis.
Figure 5:
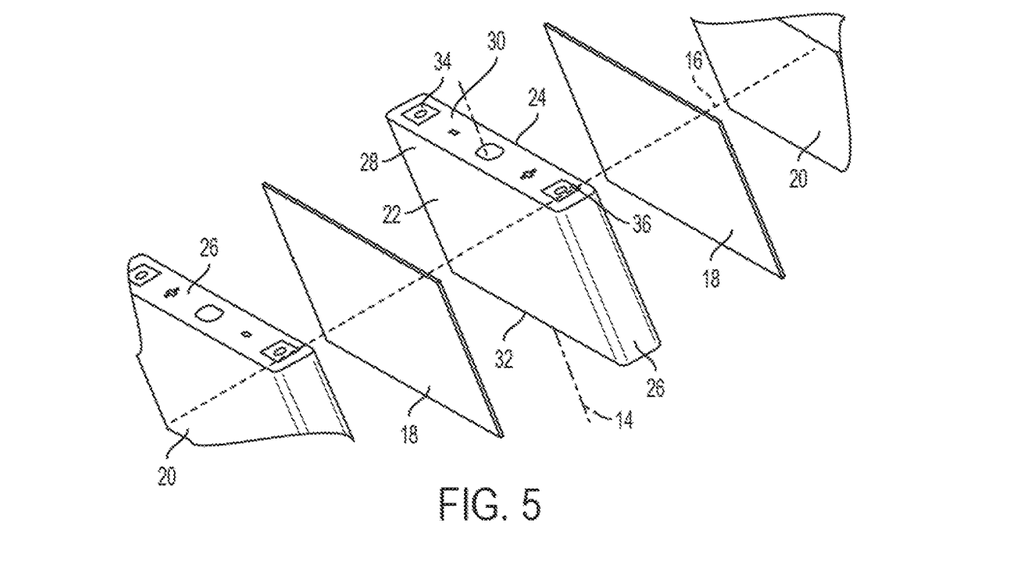
FIG. 5 is a perspective exploded view of a portion of the cell array illustrating the alternating arrangement between cells and insulative separator plates within the cell array.

Referring to FIGS. 3-5, the cells 2 are lithium-ion cells that include a cell housing 20 that encloses an electrode assembly 4 and an electrolyte to form a power generation and storage unit. The electrode assembly 4 includes at least one positive electrode 6, at least one negative electrode 8, a first electrically insulative separator 10 disposed between the positive and negative electrodes 6, 8, and a second electrically insulative separator 12 disposed on the other side of one of the positive electrode 6 and the negative electrode 8.

The positive and negative electrodes 6, 8 each have a layered structure to facilitate insertion and/or movement of lithium-ions. In the illustrated embodiment, the positive electrode 6 is formed of copper with a graphite coating, and the negative electrode 8 is formed of aluminum with a lithiated metal oxide coating. The separators 10, 12 are formed of an electrically insulating material such as a tri-layer polypropylene-polyethylene-polypropylene membrane.

The electrodes 6, 8 and separators 10, 12 are elongate strips of material that are stacked and then wound about an elliptically shaped mandrel to form an elliptically-shaped or race track-shaped jelly roll assembly 4. As used herein, the term 'strip' refers to a geometry that includes a length $l_e$ that is large (e.g., on the order of 1000×) relative to the height $h_e$, and a height $h_e$ that is large (e.g., on the order of 1000×) relative to the thickness $t_e$. For example, in some applications, the electrodes 26, 28 may have a thickness $t_e$ of 0.03 mm, a height $h_e$ of 60 mm and a length $l_e$ of 45 m.

The cell housing 20 has a rectangular prism shape (e.g., prismatic), and includes a first side 22, and a second side 24 opposed to the first side 22, a third side 26 adjoining the first side 22 and the second side 24, and a fourth side 28 opposed to the third side 26 and adjoining the first side 22 and the second side 24. The first and second sides 22, 24 have the same height as the third and fourth sides 26, 28, but have a larger width. For example, in the illustrated embodiment, the width of the first and second sides 22, 24 is about twice the height, whereas the width of the third and fourth sides 26, 28 is about one-fourth of the height. In addition, the cell housing 20 includes a first end 30 through which a positive terminal 34 and a negative terminal 36 protrude, and a second end 32 opposed to the first end. The electrode assembly 4 is disposed in the cell housing 20 such that the winding axis (e.g., the axis about which the electrodes and separators are wound) 14 extends through the first and second ends 30, 32.

The electrode assembly 4 experiences dimensional changes during battery charge and discharge. This is due at least in part to expansion of the layered structure of the positive and negative electrodes in the electrode thickness direction due to expansion of the active materials during cycling. The expansion of the jelly roll electrode assembly 4 within the cell housing 20 results in "cell growth", which corresponds to the outward bowing of the first and second sides 22, 24 of the cell housing 20 in a direction transverse to the winding axis and normal to an outer surface of the first and second sides 22, 24. The battery pack housing includes features which accommodate the growth of the cells 2 disposed therein, as discussed further below.

Referring to FIGS. 2 and 5, the array of cells 2 is disposed in the container 60 of the battery pack housing 40. For example, in the illustrated embodiment, the array includes a single row of twelve cells arranged side-by-side such that the second side 24a of one cell 2a faces the first side 22b of the adjacent cell 2b, and such that the first end 30 of each cell faces the lid 50. A stacking axis 16 corresponding to the stacking direction of the cell array is transverse to the facing surfaces (e.g., the first and second sides 22, 24) of the cells 2. An insulating separator plate 18 is disposed between facing surfaces of adjacent cells 2. The array is arranged within the battery pack housing 40 such that the first side 22 of an outermost cell 2 (1) at one end of the array faces and abuts a first inner wall 101 of the container 60, and the second side 24 of an outermost cell 2 (12) at the opposed end of the array faces and abuts a second inner wall 121 of the container 60.

Figure 6:
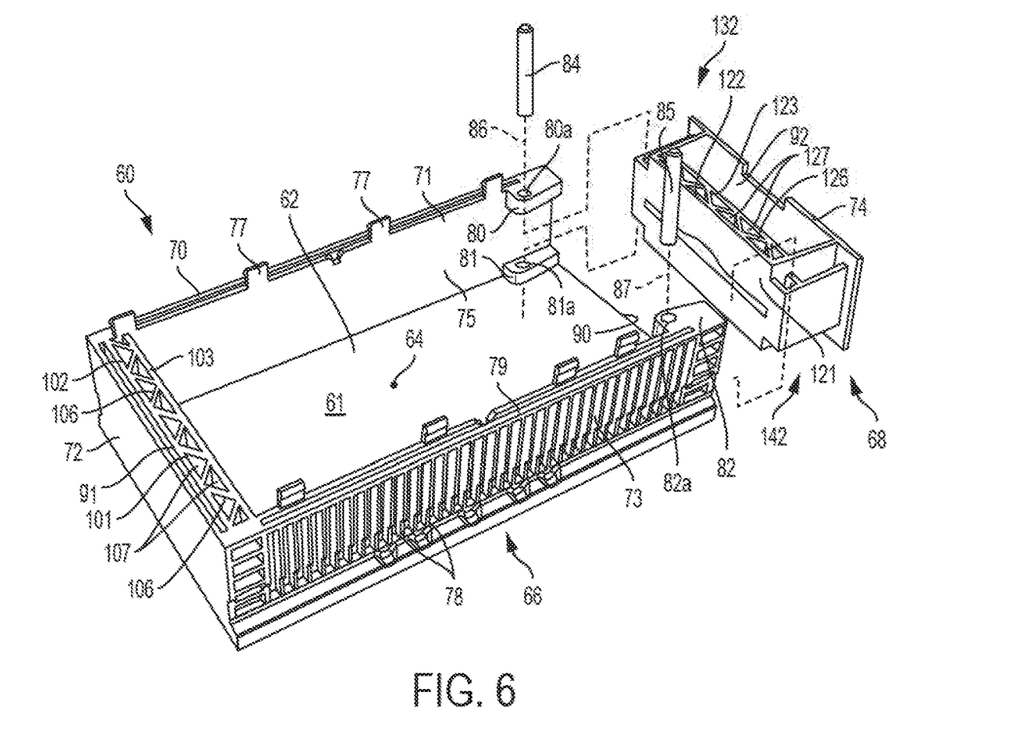
FIG. 6 is a top perspective exploded view of the container of the battery pack housing.

Referring to FIGS. 2 and 6, the container 60 is a box-like structure that includes a base 61, an outer wall 70 that surrounds the base 61 and inner walls 101, 121 disposed between portions of the outer wall 70 and the cells 2. The base 61 is rectangular, and has a length dimension that is greater than its width dimension. The base 61 includes an inner surface 62 and an outer surface 63 opposed the inner surface 62. The outer wall 70 surrounds a peripheral edge of the base 61 and protrudes from the base 61 in a direction that is normal to the base inner surface 62.

The outer wall 70 forms a rectangular closed section when seen in top plan view, and thus includes four orthogonal outer wall portions. In particular, the outer wall 70 includes a first portion 71 that extends along the length of the base 61, a second portion 72 adjoining the first portion 71 and extending a long the width of the base 61. The outer wall 70 includes a third portion 73 that adjoins the second portion 72 and is opposed to the first portion 71, and a fourth portion 74 that is opposed to the second portion 72 and adjoins the first portion 71 and the third portion 73. The first and third portions 71, 73 have a larger area than the second and fourth portions 72, 74, and are parallel to the stacking axis 16 of the cells 2. The outer surface 76 of the outer wall 70 includes surface features that enhance cooling of the battery pack. In particular, the outer surface of the first and third portions 71, 73 includes outwardly protruding cooling ribs 78. The cooling ribs 78 extend between the base 61 and a free edge 79 of the outer wall 70, and cover an area that corresponds to the position of the cells 2 disposed within the battery pack 1.

The first inner wall 101 is disposed inside the outer wall 70, and extends in the width direction. More specifically, the first inner wall 101 is parallel to and spaced apart from both the second portion 72 and the fourth portion 74, and is disposed between a center 64 of the container 60 and the second portion 72 such that a first gap $g_1$ exists between the first inner wall 101 and the second portion 72. The first gap $g_1$ is small relative to an overall length $l_o$ of the container 60 as measured between outer surfaces of the second portion 72 and the fourth portion 74, as well as the dimension d of a cell 2 in the stacking direction. For example, in some embodiments, the first gap $g_1$ is in a range of 0.5 percent to 2.0 percent of the overall length $l_o$. Similarly, in some embodiments, the first gap $g_1$ is in a range of 5 percent to 30 percent of the dimension d of the cell 2 in the stacking direction.

The first inner wall 101 includes a pair of parallel, spaced-apart plates 102, 103 that are parallel to the second portion 72 and the fourth portion 74. Angled ribs 106 extend between inner surfaces of the plates 102, 103, resulting in vacancies 107 being formed within the first inner wall 101 that contribute to the ability of the first inner wall 101 to deform under loads applied in a direction normal to the surfaces of the plates 102, 103, such as occurs during cell growth.

The first inner wall 101 extends between the first portion 71 and the third portion 73. In particular, the first inner wall 101 abuts and is fixed to each of the first portion 71, the base 61 and the third portion 73. For example, in some embodiments, the inner wall 101 is formed integrally with outer wall 70 and the base 61. In other embodiments, the inner wall 101 is fixed to the outer wall 70 and the base 61 during manufacture.

The second inner wall 121 is disposed inside the outer wall 70, and extends in the width direction. The second inner wall 121 is parallel to and spaced apart from the second portion 72 and the fourth portion 74. In addition, the second inner wall 121 is disposed between the center 64 of the container 60 and the fourth portion 74 so as to reside between the first inner wall 101 and the fourth portion 74. A second gap $g_2$ exists between the second inner wall 121 and the fourth portion 74. The second gap $g_2$ is small relative to the overall length $l_o$ of the first portion 71, and is larger than the dimension d of a cell 2 in the stacking direction. For example, in some embodiments, the second gap $g_2$ is in a range of 10 percent to 20 percent of the overall length $l_o$. However, in some embodiments, the second gap $g_2$ is in a range of 100 percent to 300 percent of the dimension d of the cell 2 in the stacking direction.

Like the first inner wall 101, the second inner wall 121 includes a pair of parallel, spaced-apart plates 122, 123 that are parallel to the fourth portion 74. Angled structural ribs 126 extend between inner surfaces of the plates 122, 123, resulting in vacancies 127 being formed within the second inner wall 121 that contribute to the ability second inner wall 121 to deform under loads applied in a direction normal to the surfaces of the plates 122, 123, such as occurs during cell growth.

Figure 7:
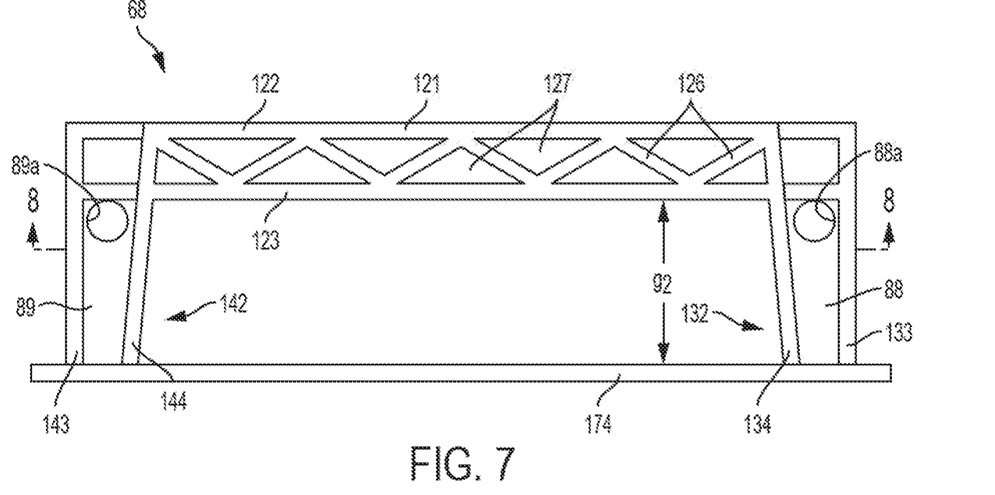
FIG. 7 is a top plan view of the second element of the container.
Figure 8:
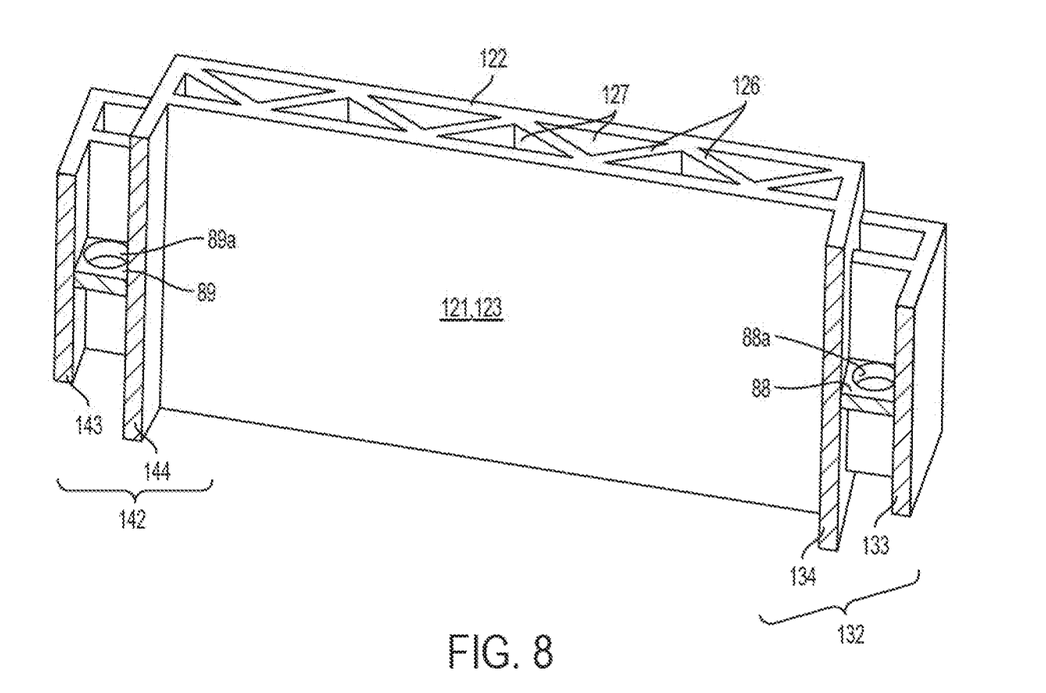
FIG. 8 is a cross-sectional view of the container as seen along line 8-8 of FIG. 7.

Referring to FIGS. 6-8, the second inner wall 121 extends between the first portion 71 and the third portion 73, but is not fixed thereto. Instead, the second inner wall 121 is fixed to the fourth portion 74 via a two pair of arms 132, 142 that extend inward from an inner surface of the fourth portion 74 and serve as a rigid spacer structure that maintains the gap $g_2$ between the second inner wall 121 and the fourth portion 74. The first pair of arms 132 is provided along one side edge of the fourth portion 74 so as to be adjacent the first portion 71, and the second pair of arms 142 is provided along the opposed side edge of the fourth portion 74 so as to be adjacent the third portion 73. A first catch plate 88 is disposed between the arms 133, 134 of the first pair of arms 132, and a second catch plate 89 is disposed between the arms 143, 144 of the second pair of arms 142. The first and second catch plates 88, 89 are parallel to the base 61 and have a catch plate opening 88a, 89a that is disposed between the second inner wall 121 and the fourth portion 74. The catch plates 88, 89 are part of a latching structure used to retain the fourth portion 74 in an assembled configuration with the remainder of the outer wall 70, as discussed further below.

In the embodiment illustrated in FIGS. 1-8, the outer wall 70 is formed as two, separate elements 66, 68 that are configured to detachably engage with each other to form the rectangular closed section described above. The first element 66 of the outer wall 70 includes the first, second and third portions 71, 72, 73 that are formed integrally with the base 61 and arranged in a U-shaped configuration when seen in top plan view. The second element 68 of the outer wall 70 includes the fourth portion 74, which, when assembled with the first element 66, closes the open end 90 of the U-shaped first element 66 (referred to hereafter as the U open end 90). The second element 68, corresponding to fourth portion 74, is formed separately from, and detachably connected to, the first element 66 via the latching structure.

The latching structure is provided on the inner surface 75 of the outer wall 70, and includes a first pair of eyes 80, 81 that protrude from an inner surface of the first portion 71 at a location adjacent the U open end 90. The eyes 80, 81 of the first pair include openings 80a, 81a that are aligned along a first axis 86 that is normal to the base inner surface 62. The latching structure includes a second pair of eyes 82, 83 (eye 83 is not visible) that protrude from an inner surface of the third portion 73 at a location adjacent the U open end 90. The eyes 82, 83 of the second pair include openings 82a, 83a that are aligned along a second axis 88 that is normal to the base inner surface 62. The latching structure also includes the first catch plate 88 that protrudes from the inner surface of the fourth portion 74 at a location adjacent the first portion 71, and the second catch plate 89 that protrudes from an inner surface of the fourth portion 74 at a location adjacent the third portion 73. When the second element 68, or fourth portion 74, is assembled with the first element 66, the first catch plate 88 is interposed between the eyes 80, 81 of the first pair such that the first catch plate opening 88a is aligned along the first axis 86 with the openings 80a, 81a of the first pair of eyes. In addition, the second catch plate 89 is interposed between the eyes 82, 83 of the second pair such that the second catch plate opening 89a is aligned along the second axis 87 with the openings 82a, 83a of the second pair of eyes. The latching structure includes a first pin 84 that is aligned with the first axis 86 and passes through the openings 80a, 88a, 81a of the first pair of eyes and the first catch plate 88, and a second pin 85 that is aligned with the second axis 87 and passes through the openings 82a, 89a, 83a of the second pair of eyes and the second catch plate 89. In particular, the first and second pins 84, 85 cooperate with corresponding eyes and catch plates formed on the outer wall inner surface 75 to detachably connect the first element 66 to the second element 68.

Figure 9:
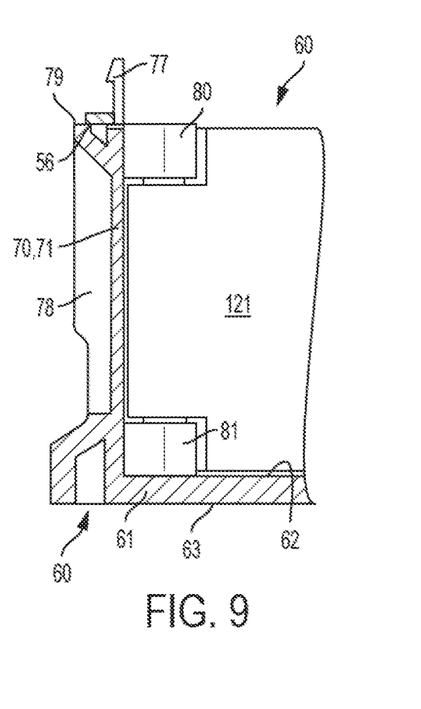
FIG. 9 is a cross-sectional view of the container as seen along line 9-9 of FIG. 10.

Referring to FIGS. 1 and 9, the lid 50 of the battery pack housing 40 is shaped and dimensioned to close the open end of the container 60. A periphery of the container-facing surface 52 of the lid 50 includes openings (not shown) that receive and engage with upright latches 77 provided on the container outer wall 70. The openings and the upright latches cooperate to retain the lid 50 in a closed configuration with respect to the container open end. The positive terminal 54 and a negative terminal 55 protrude from an outward-facing surface 51 of the lid 50.

The battery pack housing 60 is formed of a material that is electrically nonconductive and thermally conductive. For example, the battery pack housing 60 may be formed of a molded, high strength plastic with additives that improve thermal conductivity and provide electrical isolation. When used in conjunction with the cooling ribs 78, the thermally conductive battery pack housing 60 provides passive cooling of the cells 2 during operation, whereby cell operating efficiency is improved and damage to heat sensitive components of the cell 2 is prevented.

A seal 56 is provided between a periphery of the container-facing surface 52 of the lid 50 and the free edge 79 of the container outer wall 70. The seal may be a gasket or a sealing adhesive or achieved by other conventional techniques. In some embodiments where a sealing adhesive is used, the sealing adhesive permits removal of the lid 50 from the container 60, while in other embodiments the sealing adhesive provides a permanent bonding of the lid 50 to the container 60.

Figure 10:
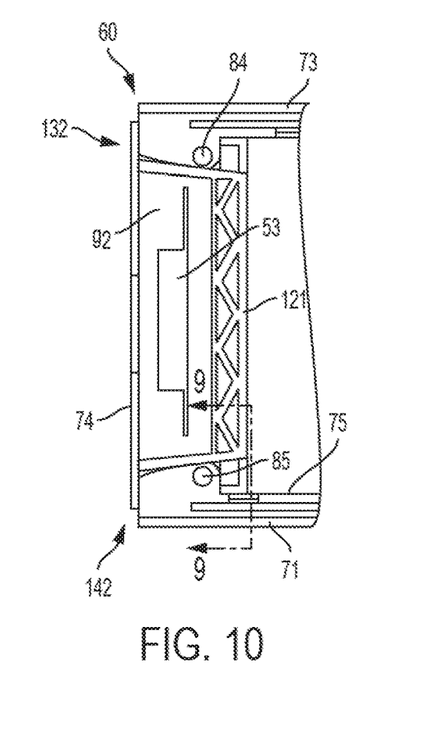
FIG. 10 is a top plan view of one end of the container of FIG. 6 illustrating a battery management device disposed in the container.

Referring to FIGS. 6, 7 and 10, the second element 68 includes the second inner wall 121 that is parallel to and spaced apart from the fourth portion 74 via the two pair of arms 132, 142. The gap $g_2$ between the second inner wall 121 and the fourth portion 74 is used to receive a battery management device 53. The battery management device 53 is electrically connected to each cell 2 disposed in the battery pack housing 40, and includes electronics configured to monitor and control function of the electrochemical cells. For example, the battery management device 53 may regulate the battery pack 1 by actively influencing the electric current flow. The electronics may include a printed circuit board, a resistance busbar, a relay, a fuse, etc. In some embodiments, the battery management device 53 is incorporated into the lid structure, and protrudes from the lid container-facing surface 52 and into the vacancy between the second inner wall 121 and the fourth portion of the outer wall 70. In other embodiments, the battery management device 53 is provided separately from the lid 50, and is disposed within the vacancy between the second inner wall 121 and the fourth portion of the outer wall 70.

The battery pack 1 is assembled as follows. The first element 66 is separated from the second element 68, and cells 2 are placed within the first element 66 while the second element 68 is disengaged from the first element 66. The cells 2 are arranged side-by-side in a 1×(number of cells) array with the electrically-insulating separator plates 18 disposed in between adjacent cells 2. The number of cells 2 placed within the battery pack 1 and the dimensions of cells 2 are set so that the overall length of the cell array in the stacking direction is greater than the distance d2 between facing surfaces of the first and second inner walls 101, 121. The second element 68 is partially assembled with the first element 66 with the second inner wall 121 abutting the outermost cell 2 (12) of the cell array. In this initial position, the fourth portion 74 does not abut the first and third portions 71, 73 due to the overall length of the cell array. The second element 68 including the second inner wall 121 is then pushed toward the first inner wall 101 until the fourth portion 74 abuts the first and third portions 71, 73. In this abutting position, the openings 80a, 81a, 82a, 83a, 88a, 89a of the latching structure are aligned along the corresponding axes 86, 87. At this time, the pins 84, 85 are inserted through the corresponding openings, whereby the second element 68 is secured to the first element 66 and the container is complete, and whereby the cells 2 are disposed within the container 60 under compression in the direction of the stacking axis 16. In some embodiments, a second seal (not shown) may be provided between abutting surfaces of the first element 66 and the second element 68. This method of assembly is achievable since the second element 68 including the second inner wall 121 is movable relative to the first element 66 including the first portion 71, the base 61 and the third portion 73. As used herein, the term "movable" refers to movement of the second inner wall 121 as a unit relative to the first and third portions 71, 73, and is considered to be different than the terms "deformation" and "deflection" which are used to refer to changes in the shape of the first and second inner walls 101, 121.

Figure 11:
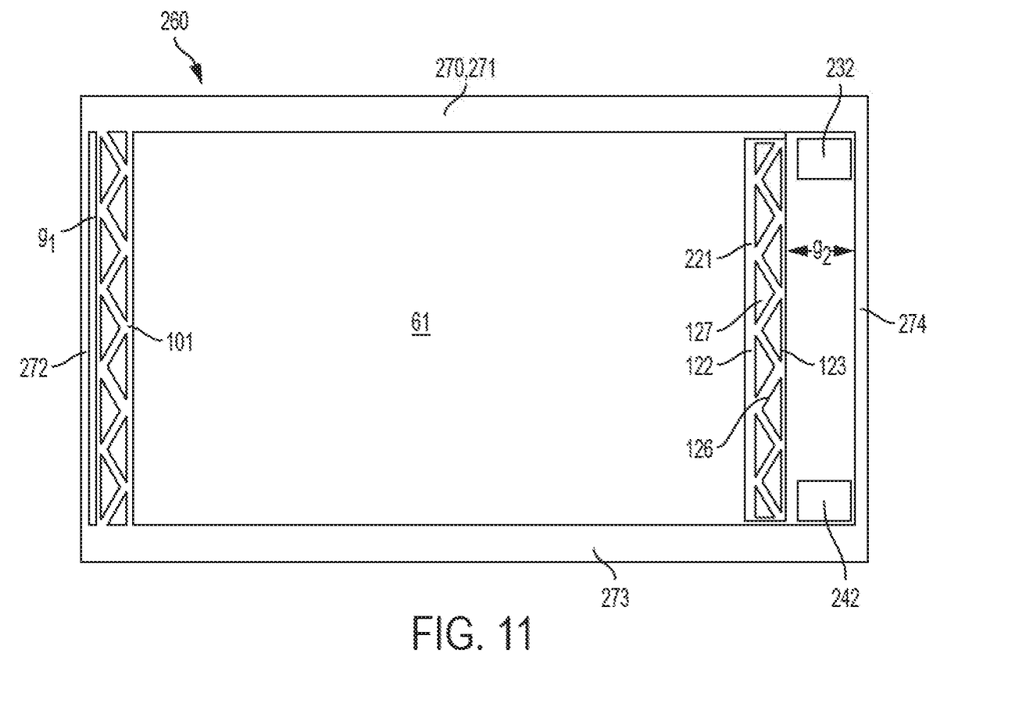
FIG. 11 is a top plan view of an alternative embodiment container.
Figure 12:
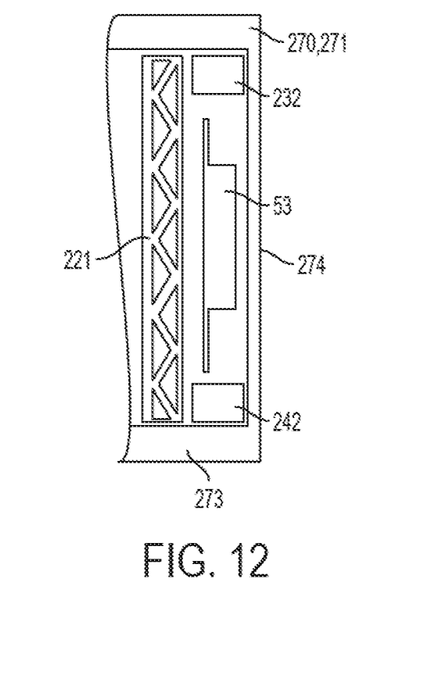
FIG. 12 is a top plan view of one end of the container of FIG. 11 illustrating a battery management device disposed in the container.

Referring to FIGS. 11-12, an alternative embodiment container 260 may be used with the lid 50 to form a battery pack. The container 260 is similar to the container 60 described above with respect to FIGS. 1-10, and common elements will be referred to using common reference numbers. The container 260 is a box-like structure that includes the base 61, an outer wall 270 that surrounds the base 61 and inner walls 101, 221 disposed between portions of the outer wall 270 and the cells 2. The outer wall 270 and the second inner wall 221 of the container 260 differ from the previously-described outer wall 70 and second inner wall 121, as now described.

In the container 260, the outer wall 270 and the base 61 are a unitary structure that includes four orthogonal outer wall portions 271, 272, 273, 274 that together surround a peripheral edge of the base 61 and protrude from the base 61 in a direction that is normal to the base inner surface 62. In some embodiments, the outer wall portions 271, 272, 273, 274 are formed integrally (e.g., as a monolithic structure) with each other and the base 61 for example using a molding process. In other embodiments, the outer wall portions 271, 272, 273, 274 are fixed to each other and the base 61 during manufacture.

As in the previously-described embodiment, the second inner wall 221 is disposed inside the outer wall 270, and extends in the width direction. The second inner wall 221 is parallel to and spaced apart from the second portion 272 and the fourth portion 274. In addition, the second inner wall 221 is disposed between the first inner wall 101 and the fourth portion 274.

The second inner wall 221 includes the pair of parallel, spaced-apart plates 122, 123 that are parallel to the fourth portion 274. Angled structural ribs 126 extend between inner surfaces of the plates 122, 123, resulting in vacancies 127 being formed within the second inner wall 221 that contribute to the ability of the second inner wall 221 to deform under loads applied in a direction normal to the surfaces of the plates 122, 123, such as occurs during cell growth.

The second inner wall 221 extends between the first portion 271 and the third portion 273, but is not fixed to the outer wall 270 or the base 61. As a result, the second inner wall 221 is movable relative to the outer wall 170 such that a spacing of the second inner wall 221 from both the first inner wall 101 and the fourth portion 274 can be changed. For example, the second inner wall 221 is free-floating with respect to the outer wall 270 and the base 61. Since the second inner wall 221 is free-floating, assembly of the cells 2 within the container 260 under a compression load in the stacking direction can be accomplished while providing a unitary, four-sided outer wall structure. The unitary, four-sided outer wall structure is dimensionally stable due to its unitary structure in combination with use of the inner walls 101, 221, and thus can be reliably sealed.

When the battery pack 100 is assembled, the second inner wall 221 is disposed between the array of cells 2 and the fourth portion 274 such that the second gap $g_2$ exists between the second inner wall 221 and the fourth portion 274. The gap $g_2$ is achieved by providing first and second spacers 232, 242 between the second inner wall 221 and the fourth portion 274. The first spacer 232 is provided along one side edge of the fourth portion 274 so as to be adjacent the first portion 271, and the second spacer 242 is provided along the opposed side edge of the fourth portion 274 so as to be adjacent the third portion 273. In the illustrated embodiment, the first and second spacers 232, 242 are rectangular tubes that are dimensioned to provide the desired gap $g_2$. In some embodiments, the first and second spacers 232, 242 are tapered along an axis that is normal to the base inner surface 62, whereby the first and second spacers 232, 242 are used drive the second inner wall 221 and the cell array toward the first inner wall 101 during assembly, and thus apply a compressive force to the cell array in the stacking direction. In addition, the first and second spacers 232, 242 maintain the gap $g_2$ between the second inner wall 221 and the fourth portion 274 upon assembly.

Figure 13:
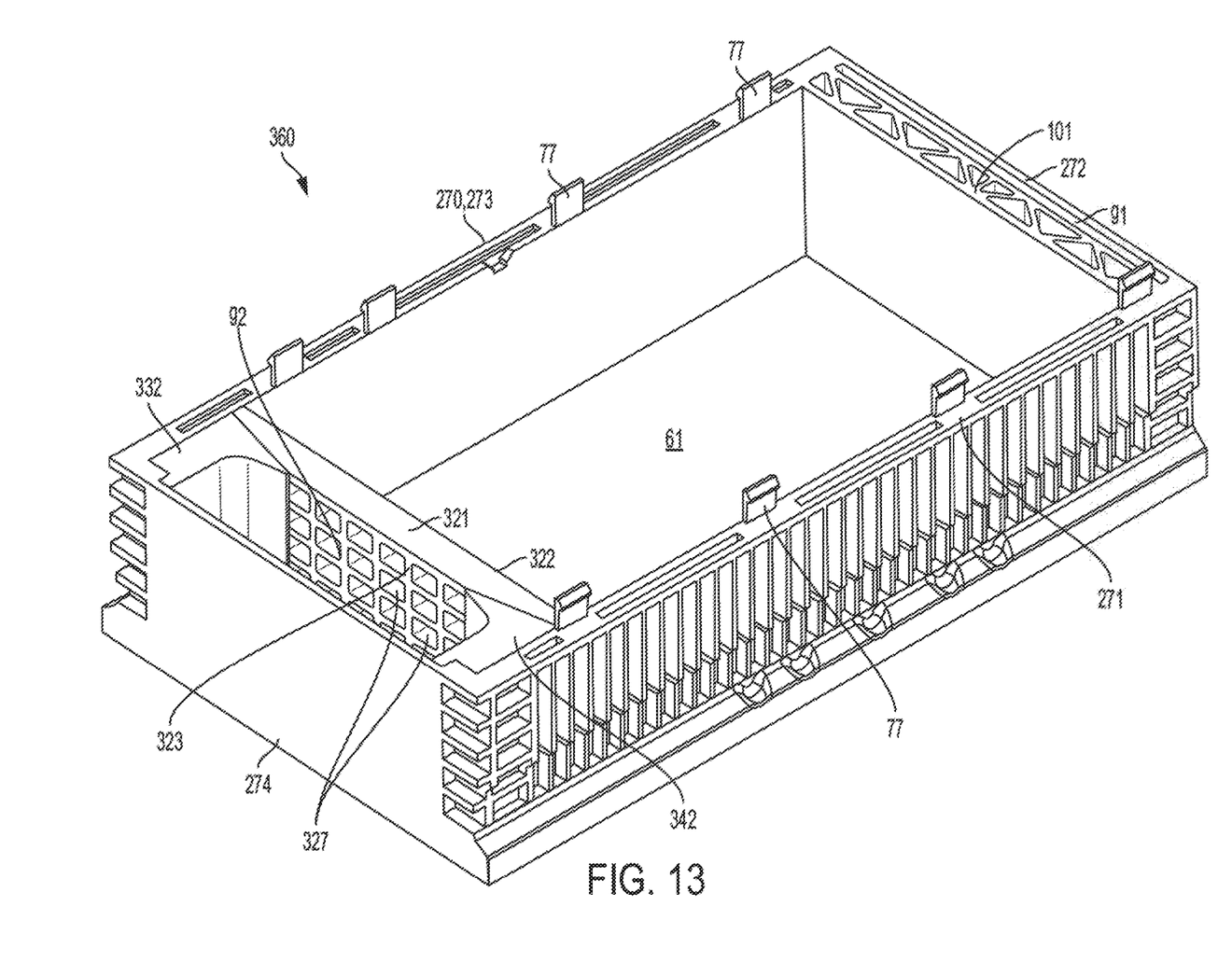
FIG. 13 is a perspective view of another alternative embodiment container.

Referring to FIG. 13, another alternative embodiment container 360 may be used with the lid 50 to form a battery pack. The container 360 is similar to the container 260 described above with respect to FIGS. 11-12, and common elements will be referred to using common reference numbers. The container 360 is a box-like structure that includes the base 61, an outer wall 270 that surrounds the base 61 and inner walls 101, 321 disposed between portions of the outer wall 270 and the cells 2. The second inner wall 321 of the container 360 differs from the second inner wall 221 of FIGS. 11-12 as described in detail below.

In the container 360, the outer wall 270 and the base 61 are a unitary structure that includes four orthogonal outer wall portions 271, 272, 273, 274 that together surround a peripheral edge of the base 61 and protrude from the base 61 in a direction that is normal to the base inner surface 62. In some embodiments, the outer wall portions 271, 272, 273, 274 are formed integrally (e.g., as a monolithic structure) with each other and the base 61 for example using a molding process. In other embodiments, the outer wall portions 271, 272, 273, 274 are fixed to each other and the base 61 during manufacture.

As in the previously-described embodiment, the second inner wall 321 is disposed inside the outer wall 270, and extends in the width direction. The second inner wall 321 is parallel to and spaced apart from the second portion 272 and the fourth portion 274. In addition, the second inner wall 321 is disposed between the first inner wall 101 and the fourth portion 274.

The second inner wall 321 is formed having an open cell structure including angled structural ribs 326 that extend in a direction perpendicular to the second inner wall inner face 322, in parallel to the first and third outer wall portions 271, 273, and define rectangular open cells or vacancies 327. The vacancies 327 formed within the second inner wall 321 contribute to the ability of the second inner wall 321 to deform under loads applied in a direction normal to the second inner wall 321, such as occurs during cell growth. Although the second inner wall inner face 322 is parallel to the second and fourth portions 272, 274, the opposed second inner wall outer face 323 may not be parallel to the second and fourth portions 272, 274 in order to provide a wall geometry in which wall strength is optimized. The illustrated embodiment shows one possible second inner wall 321 configuration, in which the outer face 323 is curved as seen in a top plan view of the container 360. In this example, the second inner wall outer face 323 is convex so as to protrude toward the second portion, whereby a center portion of the second inner wall 321 has a greater thickness than portions of the second inner wall 321 adjacent the first and third portions 271, 273.

The second inner wall 321 extends between the first portion 271 and the third portion 273, but is not fixed to the outer wall 270 or the base 61. As a result, the second inner wall 321 is movable relative to the outer wall 270 such that a spacing of the second inner wall 321 from both the first inner wall 101 and the fourth portion 274 can be changed. For example, the second inner wall 321 is free-floating with respect to the outer wall 270 and the base 61. Since the second inner wall 321 is free-floating, assembly of the cells 2 within the container 260 under a compression load in the stacking direction can be accomplished while providing a unitary, four-sided outer wall structure. The unitary, four-sided outer wall structure is dimensionally stable due to its unitary structure in combination with use of the inner walls 101, 321, and thus can be reliably sealed.

When the battery pack 100 is assembled, the second inner wall 321 is disposed between the array of cells 2 and the fourth portion 274 such that the second gap g exists between the second inner wall 321 and the fourth portion 274. The gap $g_2$ is achieved by providing first and second spacers 332, 342 between the second inner wall 321 and the fourth portion 274. The first spacer 332 is provided along one side edge of the fourth portion 274 so as to be adjacent the first portion 271, and the second spacer 342 is provided along the opposed side edge of the fourth portion 274 so as to be adjacent the third portion 273. In the illustrated embodiment, the first and second spacers 332, 342 are rigid elements that are dimensioned to provide the desired gap $g_2$, and are shaped to correspond to, and cooperate with, the shape of the second inner wall outer face 323. In particular, the shape of the first and second spacers 332, 342 is optimized together with the shape of the second inner wall 321 to provide optimal strength of the second inner wall 321. In some embodiments, the first and second spacers 332, 342 may be tapered along an axis that is normal to the base inner surface 62, whereby the first and second spacers 332, 342 are used drive the second inner wall 321 and the cell array toward the first inner wall 101 during assembly, and thus apply a compressive force to the cell array in the stacking direction. In addition, the first and second spacers 332, 342 maintain the gap $g_2$ between the second inner wall 321 and the fourth portion 274 upon assembly.

Although the containers 60, 260, 360 described herein each include a fixed first inner wall 101 that is separated from the outer wall 70, 270 via a first gap $g_1$, it is contemplated that the gap $g_1$ may be eliminated in some embodiments, whereby the inner wall 101 would become the second portion 72, 272 of the outer wall 70, 720, and would have properties that would permit some deformation of the inward facing surface 122 thereof.

Although the cells 2 are described as housing the electrode assembly 4 having a jelly roll electrode configuration, the electrode assembly 4 is not limited to this electrode configuration. For example, the electrode assembly 4 may include a stacked or folded arrangement of electrode plates, or other suitable electrode arrangement.

Although the cells 2 are described as being lithium ion cells, the cells 2 are not limited to this type of cell. For example, the cells 2 may include different combinations of electrode materials and electrolytes, including lead-acid, nickel cadmium (NiCd), nickel metal hydride (NiMH), and lithium ion polymer.

Although the illustrated embodiment includes twelve cells 2 in the cell array, the battery pack 1 is not limited to having twelve cells 2. The number of cells used may be greater or fewer than twelve, and is determined by the requirements of the specific application.

Selective illustrative embodiments of the battery pack and battery pack housing are described above in some detail. It should be understood that only structures considered necessary for clarifying these devices have been described herein. Other conventional structures, and those of ancillary and auxiliary components of the battery pack system, are assumed to be known and understood by those skilled in the art. Moreover, while working examples of the battery pack and battery pack housing been described above, the battery pack and/or battery pack housing is not limited to the working examples described above, but various design alterations may be carried out without departing from the devices as set forth in the claims.

What is claimed is:

1. A battery pack housing configured to receive an array of electrochemical cells, the cells of the array disposed side-by-side along a stacking axis when received within the battery pack housing, the battery pack housing comprising a container that includes:
   a base that includes an inner surface, an outer surface opposed to the inner surface, and a peripheral edge that joins the inner surface to the outer surface;
   an outer wall that surrounds the peripheral edge and protrudes from the base in a direction that is normal to the inner surface of the base, the outer wall including a first portion, a second portion adjoining the first portion, a third portion adjoining the second portion and opposed to the first portion, and a fourth portion opposed to the second portion;
   an inner wall that extends between the first portion and the third portion, and is disposed between the second portion and the fourth portion, the inner wall including an inner surface configured to contact an outermost portion of the array of electrochemical cells; and
   a rigid spacer configured to abut the inner wall, the spacer being tapered along an axis that is perpendicular to the base in such a way that in response to a first force applied to the spacer along the axis that is perpendicular to the base, the spacer, the outer wall, and the inner wall cooperate to apply a compressive second force to the array of electrochemical cells in a direction parallel to the stacking axis when the array of electrochemical cells is received within the battery pack housing.

2. The battery pack housing of claim 1, wherein the spacer is disposed between the inner wall and the fourth portion, and is configured to maintain a gap between the inner wall and the fourth portion.

3. The battery pack housing of claim 2, wherein
   the gap has a gap dimension that corresponds to a distance between the inner wall and the fourth portion,
   the spacer includes a first surface that faces the inner wall with no intervening structures, and a second surface that is opposite the first surface, the second surface facing the fourth portion with no intervening structures, and
   a distance between the first surface and the second surface corresponds to the gap dimension.

4. The battery pack housing of claim 2, wherein the gap is shaped and dimensioned to receive a battery management device that is configured to monitor and control the electrochemical cells.

5. The battery pack housing of claim 1, wherein
   the spacer includes a first surface that faces the inner wall, and a second surface that is opposite the first surface, and
   one of the first surface and the second surface is tapered along the axis that is perpendicular to the base.

6. The battery pack housing of claim 1, wherein the spacer comprises a first spacer and a second spacer that is spaced apart from the first spacer, the first spacer and the second spacer each having a polygonal shape.

7. The battery pack housing of claim 6, wherein
   the first spacer is disposed along one side edge of the inner wall so as to be adjacent to the first portion,
   the second spacer is disposed along a side edge of the inner wall that is opposed to the one side edge such that the second spacer is disposed adjacent to the third portion,
   a gap is disposed between the first spacer and the second spacer, and
   the gap is shaped and dimensioned to receive a battery management device therein.

8. The battery pack housing of claim 1, wherein the inner wall is free-floating relative to the outer wall such that a spacing of the inner wall from the fourth portion can be changed.

9. The battery pack housing of claim 1, wherein
   the inner surface is parallel to and faces the second portion,
   the inner wall has an outer surface that is opposed to the inner surface,
   the outer surface faces the fourth portion, and
   at least a portion of the outer surface is not parallel to the fourth portion when the array of electrochemical cells is received within the battery pack housing.

10. A battery pack comprising:
    a battery pack housing; and
    an array of electrochemical cells disposed in the battery pack housing, the cells of the array disposed side-by-side along a stacking axis,
    the battery pack housing including a container, and a lid that closes an open end of the container, the container including:
      a base that includes an inner surface, an outer surface opposed to the inner surface, and a peripheral edge that joins the inner surface to the outer surface;
      an outer wall that surrounds the peripheral edge and protrudes from the base in a direction that is normal to the inner surface of the base, the outer wall including a first portion, a second portion adjoining the first portion, a third portion adjoining the second portion and opposed to the first portion, and a fourth portion opposed to the second portion;
      an inner wall that extends between the first portion and the third portion, and is disposed between the second portion and the fourth portion, the inner wall including an inner surface contacting an outermost portion of the array of electrochemical cells; and
      a rigid spacer that abuts the inner wall, the spacer being tapered along an axis that is perpendicular to the base in such a way that in response to a first force applied to the spacer along the axis that is perpendicular to the base, the spacer, outer wall, and inner wall cooperate to apply a compressive second force to the array of electrochemical cells in a direction parallel to the stacking axis.

11. The battery pack of claim 10, wherein the spacer is disposed between the inner wall and the fourth portion, and is configured to maintain a gap between the inner wall and the fourth portion.

12. The battery pack of claim 11, wherein
    the gap has a gap dimension that corresponds to a distance between the inner wall and the fourth portion,
    the spacer includes a first surface that faces the inner wall with no intervening structures, and a second surface that is opposite the first surface, the second surface facing the fourth portion with no intervening structures, and
    a distance between the first surface and the second surface corresponds to the gap dimension.

13. The battery pack of claim 11, wherein the gap is shaped and dimensioned to receive a battery management device that is configured to monitor and control the electrochemical cells.

14. The battery pack of claim 10, wherein
the spacer includes a first surface that faces the inner wall, and a second surface that is opposite the first surface, and
one of the first surface and the second surface is tapered along the axis that is perpendicular to the base.

15. The battery pack of claim 10, wherein the spacer comprises a first spacer and a second spacer that is spaced apart from the first spacer, the first spacer and the second spacer each having a polygonal shape.

16. The battery pack of claim 15, wherein
the first spacer is disposed along one side edge of the inner wall so as to be adjacent to the first portion,
the second spacer is disposed along a side edge of the inner wall that is opposed to the one side edge such that the second spacer is disposed adjacent to the third portion,
a gap is disposed between the first spacer and the second spacer, and
the gap is shaped and dimensioned to receive a battery management device therein.

17. The battery pack of claim 10, wherein the inner wall is free-floating relative to the outer wall such that a spacing of the inner wall from the fourth portion can be changed.

18. The battery pack of claim 10, wherein
the inner surface is parallel to and faces the second portion,
the inner wall has an outer surface that is opposed to the inner surface,
the outer surface faces the fourth portion, and
at least a portion of the outer surface is not parallel to the fourth portion.

\* \* \* \* \*

UNITED STATES PATENT AND TRADEMARK OFFICE
CERTIFICATE OF CORRECTION

PATENT NO. : 11,658,360 B2  
APPLICATION NO. : 16/933795  
DATED : May 23, 2023  
INVENTOR(S) : Nietling et al.

Page 1 of 1

It is certified that error appears in the above-identified patent and that said Letters Patent is hereby corrected as shown below:

On the Title Page

On Page 2, in item (56) References Cited, under the heading "U.S. PATENT DOCUMENTS," in Line 6:
"2013/0288098"
Should read:
--2013/0288096--.

Signed and Sealed this
Twenty-ninth Day of August, 2023

Katherine Kelly Vidal
*Director of the United States Patent and Trademark Office*